Mar. 13, 1923.
1,448,117
O. C. HANSEN
DIFFERENTIAL STEERING MECHANISM FOR TRACTORS
Filed May 31, 1922  2 sheets-sheet 1
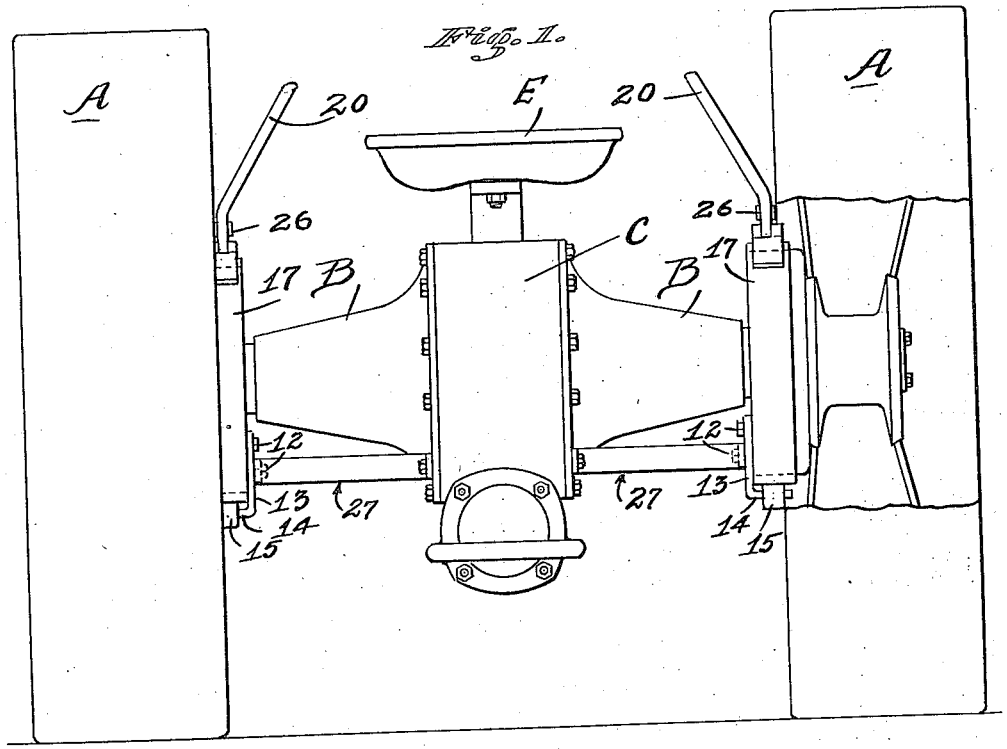
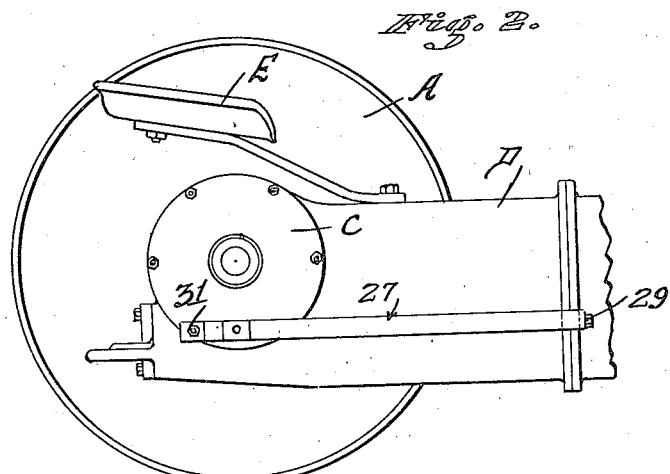
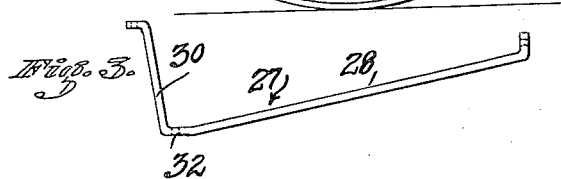

Mar. 13, 1923.
O. C. HANSEN
1,448,117
DIFFERENTIAL STEERING MECHANISM FOR TRACTORS
Filed May 31, 1922    2 sheets-sheet 2
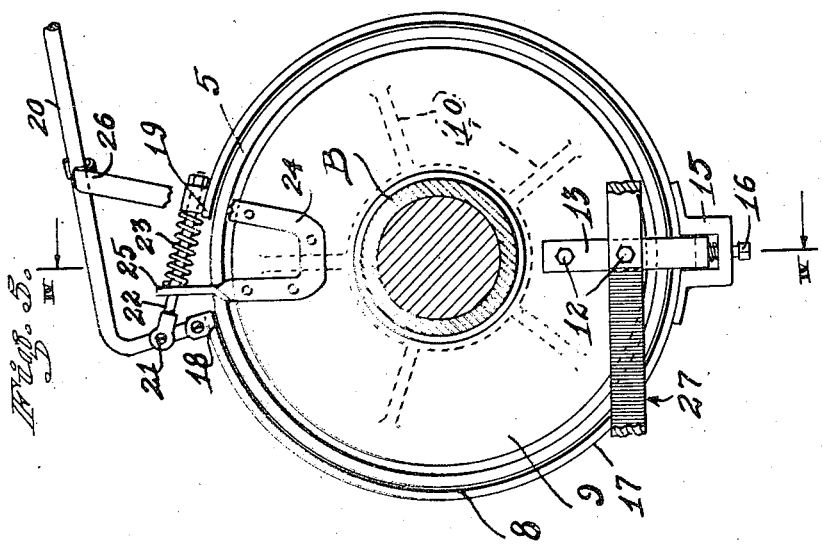
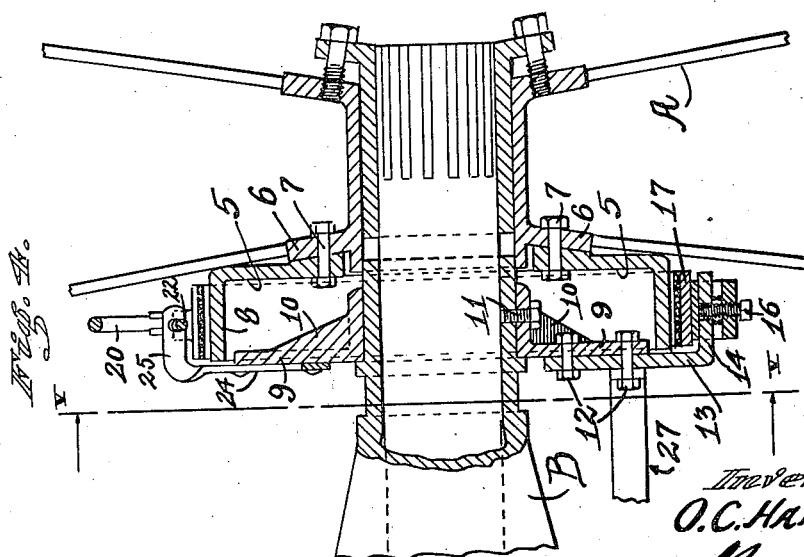
Inventor
O. C. Hansen
By Munn & Co.
Attorneys.

Patented Mar. 13, 1923.

1,448,117

UNITED STATES PATENT OFFICE.

OSCAR CHARLES HANSEN, OF OROSI, CALIFORNIA.

DIFFERENTIAL STEERING MECHANISM FOR TRACTORS.

Application filed May 31, 1922. Serial No. 564,742.

*To all whom it may concern:*

Be it known that I, OSCAR CHARLES HANSEN, a citizen of the United States, and a resident of Orosi, county of Tulare, and State of California, have invented a new and useful Differential Steering Mechanism for Tractors, of which the following is a specification.

My invention relates in general to tractors and particularly to a differential steering mechanism adapted to be applied to the existing parts of a tractor without departing from the original tractor construction and intended to function as a secondary steering mechanism or in conjunction with the existing steering mechanism to enable turns and other maneuvers to be made in restricted areas.

The invention is illustrated in the accompanying drawings in which Figure 1 is a rear elevation of a conventional type of tractor illustrating the application of the invention; Figure 2 is a view in side elevation of the back portion of a tractor with one of the wheels removed; Figure 3 is a detail view of one of the truss rods; Figure 4 is a sectional view on the line 4—4 of Figure 5, and Figure 5 is a cross-section on the line 5—5 Figure 4.

Referring now to the drawings in detail (A) represents the tractor wheels, (B) the axle housing, (C) the differential box, (D) the transmission case and (E) the driver's seat. Tractors of the wheeled type are usually steered by a steering wheel the same being turned by a suitable steering mechanism including a steering wheel or the like located adjacent the driver's seat. It so happens that while this kind of mechanism is sufficient in steering on straight aways or wide turns it is inadequate for maneuvering in restricted areas, particularly in making sharp turns. My invention may be applied to meet the requirements above pointed out as lacking in the existing type and one feature of the invention resides in its simplicity of construction which enables it to be used vertically as an attachment rather than a complicated structure requiring a decided change in the existing parts of the tractor.

In practice I prefer to employ a pair of brake drums (5) clamped to the hubs (6) of each wheel (A) by bolts or the like (7).

The open faces (8) of the drums are closed by discs (9) having strengthening webs (10) and the discs are fixed to the axle housing by set screws as at (11). Bolted or otherwise attached to each of the discs (9) as at (12) is an L-shaped strap (13) the bent ends (14) of which extend into the U-brackets (15) and with the screw clamping devices (16) adapted to support the band (17) around each of the drums (5). The bands (17) are split to leave two confronting ends (18) and (19). Pivoted to the end (18) of each band is a bent manually manipulated lever (20) the same extending upward and forward and terminating within reach of the driver on opposite sides of the seat (E). Pivoted to each of the levers as at (21) is a link (22) the opposite end of which being fixed to the end (19) of the band. This toggle connection will enable the ends of the bands to be drawn together by the levers (20) for clamping the bands around their respective drums so that the wheels may be selectively retarded. A spring (23) is coiled around each of the links (22) with its ends anchored to hold the ends of the bands normally apart.

Fixed to the side of each disc (9) is a U-shaped strap (24) one end of which providing a guide support (25) for respective ones of the links and the opposite end extending upwardly to provide supports (26) for the levers (20).

The entire structure is suitably braced by truss rods (27) one arm (28) of which extending longitudinally of the transmission case (D) and fixed thereto as at (29) and the other arm (30) having its extremity attached to the differential box as at (31) and the corner (32) fixed to the L-shaped strap (14) by one of the bolts (12).

From the above it will be seen that by manipulating either of the levers (20) a differential steering effect may be realized through the wheels so that the tractor may be maneuvered over restricted areas and steered around sharp turns without relying upon the ordinary steering wheel.

I claim:

A differential steering attachment for tractors of the wheel type, comprising a pair of brake drums adapted to be mounted on the axle housing and fixed to the ground wheels of the tractor, a brake band for each brake drum, a lever for manipulating each brake band, a disc closure for the open side of each brake drum, said disc being fixed to the axle housing and having brackets attached thereto for supporting the manipulating levers when the levers are inactive, truss rods between said discs and the differential housing of the tractor, and brackets also carried by said discs having screw clamping devices for supporting the brake bands around the brake drums.

OSCAR CHARLES HANSEN.